(12) United States Patent
Miwa et al.

(10) Patent No.: US 12,710,083 B2
(45) Date of Patent: Aug. 18, 2026

(54) SYSTEMS AND DEVICES FOR ABSORBING VIBRATIONS AND/OR FLEXURAL WAVES ACTING UPON A STRUCTURE

(71) Applicants: Toyota Motor Engineering & Manufacturing North America, Inc., Plano, TX (US); Toyota Jidosha Kabushiki Kaisha, Toyota (JP)

(72) Inventors: Tomohiro Miwa, Toyota (JP); Miki Nakahara, Toyota (JP); Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 346 days.

(21) Appl. No.: 18/453,515

(22) Filed: Aug. 22, 2023

(65) Prior Publication Data

US 2025/0067316 A1 Feb. 27, 2025

(51) Int. Cl.
*F16F 7/108* (2006.01)

(52) U.S. Cl.
CPC .......... *F16F 7/108* (2013.01); *F16F 2222/08* (2013.01); *F16F 2224/025* (2013.01); *F16F 2230/0041* (2013.01)

(58) Field of Classification Search
CPC .. F16F 7/108; F16F 2222/08; F16F 2224/025; F16F 2230/0041; G10K 11/172
See application file for complete search history.

(56) References Cited

U.S. PATENT DOCUMENTS

| | | | |
|---|---|---|---|
| 5,714,917 | A | 2/1998 | Ella |
| 8,018,127 | B2 | 9/2011 | Kikushima et al. |
| 9,166,554 | B2 | 10/2015 | Yamada |
| 9,748,922 | B2 | 8/2017 | Ishino et al. |
| 9,837,982 | B2 | 12/2017 | Il et al. |
| 10,050,602 | B2 | 8/2018 | Nguyen et al. |

(Continued)

FOREIGN PATENT DOCUMENTS

| | | | |
|---|---|---|---|
| JP | 2016109283 | A | 6/2016 |
| WO | WO 2019/199373 | * | 10/2019 |

OTHER PUBLICATIONS

Basu et al. "Microelectromechanical resonators for radio frequency communication applications." Microsystem technologies 17 (2011): pp. 1557-1580.

(Continued)

*Primary Examiner* — Pamela Rodriguez
(74) *Attorney, Agent, or Firm* — Christopher G. Darrow; Darrow Mustafa PC

(57) ABSTRACT

Disclosed are systems for absorbing and/or isolating vibrations and/or flexural waves acting upon a structure using scatterers. In one example, a scatterer includes a pair of supports separated from each other by a distance, a flexible material extending between the supports, and a mass disposed on the flexible material. The flexible material acts as a spring and damper in a mass-spring-damper system, while the mass acts as a mass in a mass-spring-damper system. This scatterer may also include the ability to be switched on/off by placing a member within a cavity defined between the supports and the flexible material.

13 Claims, 8 Drawing Sheets

(56) References Cited

U.S. PATENT DOCUMENTS

| | | | | |
|---|---|---|---|---|
| 11,333,215 | B2 * | 5/2022 | Lammi | B64C 11/008 |
| 11,524,637 | B2 * | 12/2022 | Chang | B60R 13/0884 |
| 2007/0068756 | A1 * | 3/2007 | Huston | F16F 7/1005 267/140.15 |
| 2007/0210879 | A1 | 9/2007 | Cardona et al. | |
| 2009/0100925 | A1 | 4/2009 | DiFoggio et al. | |
| 2011/0227450 | A1 | 9/2011 | Yamazaki | |
| 2011/0227660 | A1 | 9/2011 | Mikami | |
| 2022/0051650 | A1 * | 2/2022 | Lee | G10K 11/172 |
| 2022/0285604 | A1 * | 9/2022 | Li | H10N 30/304 |
| 2022/0403903 | A1 * | 12/2022 | Myklebust | F16F 7/104 |

OTHER PUBLICATIONS

Cao et al. “Perfect absorption of flexural waves induced by bound state in the continuum”, Extreme Mechanics, Elsevier, Letters 47, 101364 (2021) pp. 1-17.

Ji et al. “Investigations on flexural wave propagation and attenuation in a modified one-dimensional acoustic black hole using a laser excitation technique”, Mechanical Systems and Signal Processing 104, (2018) pp. 19-35.

Li et al. “A self-adaptive metamaterial beam with digitally controlled resonators for subwavelength broadband flexural wave attenuation”, Smart Materials and Structures 27, 045015, (2018) pp. 1-13.

Liu et al. Design guidelines for flexural wave attenuation of slender beams with local resonators, Physics Letters A 362, (2007) pp. 344-347.

Li et al. “An active meta-layer for optimal flexural wave absorption and cloaking”, Mechanical Systems and Signal Processing 149, 107324 (2021) pp. 1-13.

Cao et al., “Flexural wave absorption by lossy gradient elastic metasurface”, Journal of the Mechanics and Physics of Solids 143, (Oct. 2020) 104052, pp. 1-59.

Chen et al., “A Programmable Metasurface for Real Time Control of Broadband Elastic Rays.” Smart Materials and Structures 27, (2018) 115011, pp. 1-19.

D. Lapin, “A monopole-dipole resonator for flexural waves in a rod,” Acoustical Physics 50, 77 80 (2004).

* cited by examiner

SYSTEMS AND DEVICES FOR ABSORBING VIBRATIONS AND/OR FLEXURAL WAVES ACTING UPON A STRUCTURE

TECHNICAL FIELD

The present disclosure generally relates to systems and devices for absorbing vibrations and/or flexural waves acting upon a structure.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Flexural waves, sometimes called bending waves, deform the structure transversely as they propagate. Flexural waves are more complicated than compressional or shear waves and depend on material and geometric properties. Airborne noises can be created by flexural waves when an object comes into contact with a structure subjected to a flexural wave. Flexural vibrations of thin structures, such as beams, plates, and shells are the most common noise source caused by flexural waves.

Traditional sound absorption methods have been utilized to reduce noise caused by flexural waves, including installing sound absorbing materials that absorb radiated sound, applying damping materials to reduce vibration, and/or adding high-mass structures to prevent the passage of vibrations. However, these traditional sound absorption methods only reduce the airborne noise and do not significantly impact the flexural wave, which is the root cause of the airborne noise.

SUMMARY

This section generally summarizes the disclosure and is not a comprehensive disclosure of its full scope or all its features.

In one example, a scatterer includes a pair of supports separated from each other by a distance, a flexible material extending between the supports, and a mass disposed on the flexible material. The flexible material acts as a spring and damper in a mass-spring-damper system, while the mass acts as a mass in a mass-spring-damper system. This scatterer may also include the ability to be switched on/off by placing a member within a cavity defined between the supports and the flexible material.

In another example, a system for absorbing a flexural wave acting on a structure includes a pair of scatterers disposed of on the structure and separated from each other by a separation distance. Each scatterer forming the pair of scatterers may include a pair of supports separated by a distance, a flexible material extending between the supports, and a mass disposed on the flexible material. The flexible material acts as a spring and damper in a mass-spring-damper system, while the mass acts as a mass in a mass-spring-damper system. Like before, the scatterers forming the pair of scatterers may also include the ability to be switched on/off by placing a member within a cavity defined between the supports and the flexible material.

In yet another example, a system for absorbing a vibration acting on a finite beam includes a pair of scatterers disposed along the length of the finite beam and separated from each other by a separation distance. Again, each scatterer forming the pair of scatterers may include a pair of supports separated by a distance, a flexible material extending between the supports, and a mass disposed on the flexible material. The flexible material acts as a spring and damper in a mass-spring-damper system, while the mass acts as a mass in a mass-spring-damper system. Like before, the scatterers forming the pair of scatterers may also include the ability to be switched on/off by placing a member within a cavity defined between the supports and the flexible material.

Further areas of applicability and various methods of enhancing the disclosed technology will become apparent from the description provided. The description and specific examples in this summary are intended for illustration only and not to limit the scope of the present disclosure.

BRIEF DESCRIPTION OF THE DRAWINGS

The accompanying drawings, which are incorporated in and constitute a part of the specification, illustrate various systems and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

FIGS. 4A and 4B illustrate the pair of scatterers of FIG. 3 having different arrangements, wherein FIG. 4A shows the scatterers being mounted to the same side of a beam, while FIG. 4B shows one scatterer being mounted to one side of the beam and another scatterer being mounted to the other side of the beam.

DETAILED DESCRIPTION

Described are systems utilizing scatterers for absorbing vibrations and/or flexural waves acting on a structure. Systems that utilize the scatterers may be able to absorb vibrations, including flexural waves in a beam or plate-like structure. When the structure is a beam, the system may include a pair of scatterers disposed of on the beam. The scatterers may be separated from one another at a distance that is approximately one-quarter of the wavelength of the flexural wave acting on the beam.

As to the scatterer itself, in one example, the scatterer may include a pair of supports and a flexible material extending between the pair of supports with a mass connected to the flexible material, defining a cavity between the pair of supports and the flexible material. Generally, the scatterers may have a resonant frequency that is substantially similar, but may vary slightly, from the frequency of the flexural wave and/or vibration acting on the beam.

The scatterer may also include a member configured to be selectively placed within the cavity to prevent the flexing of the flexible material when located within the cavity. When the member is inserted into the cavity, the movement of the flexible material is prohibited, essentially turning the scatterer off. Conversely, when the member is removed from the cavity, the flexible material can move, turning the scatterer on.

Figure 1A:
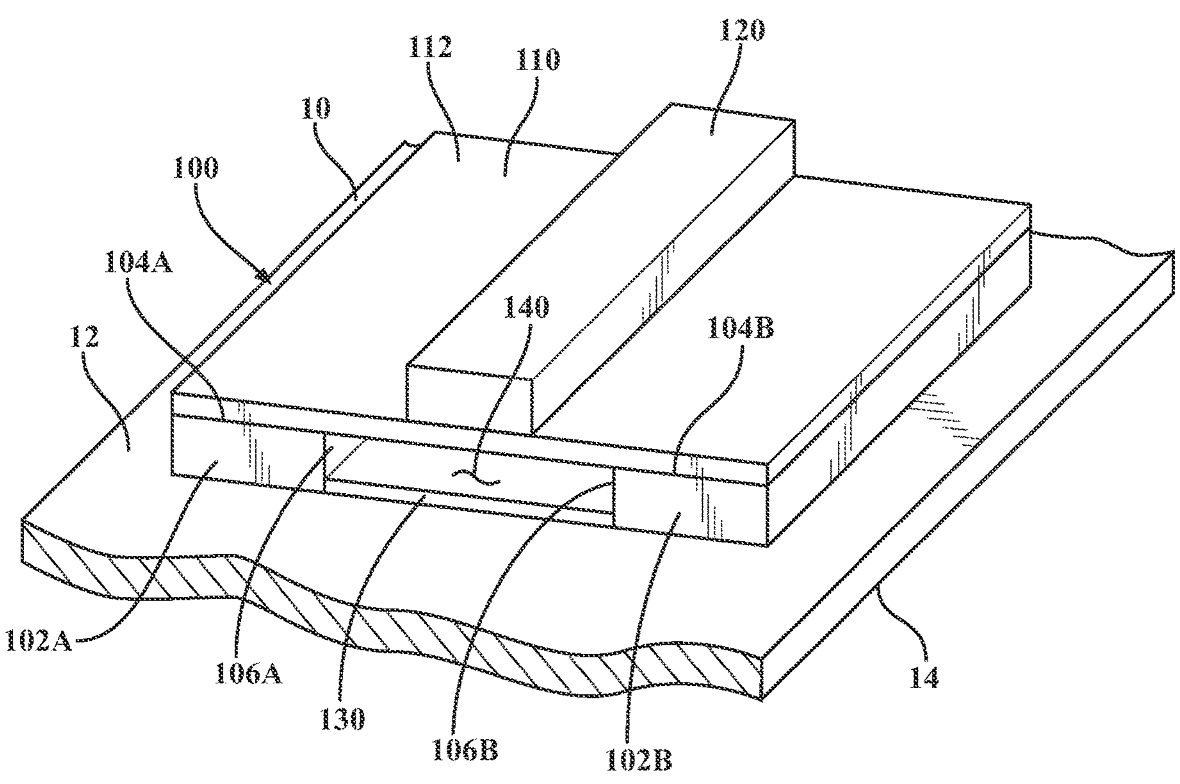
FIGS. 1A and 1B illustrate different views of one example of a scatterer capable of absorbing vibrations and/or flexural waves acting upon a structure.
Figure 1B:
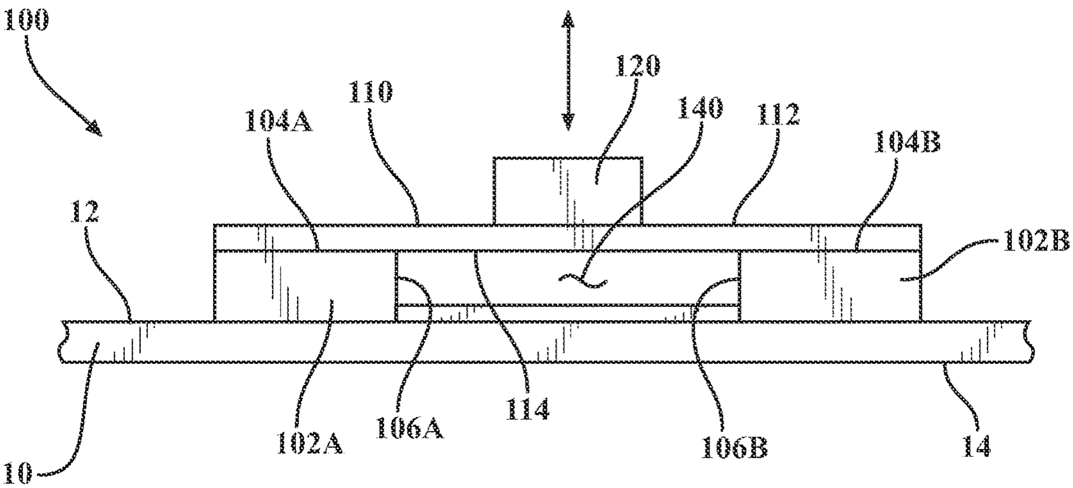

FIGS. 1A and 1B illustrate a scatterer 100 disposed of on a plate-like structure. In this example, the plate-like structure is a beam 10 having a top side 12 and a bottom side 14. Here, the scatterer 100 is located on the top side 12 of the beam 10. The scatterer 100 can be attached to the beam 10 using various methodologies, including adhesion, welding, fasteners, screws, etc. In this example, the beam 10 may be finite and may have a fixed end. Of course, this is but one example of the beam 10, and the beam 10 may be infinite and/or not have any fixed ends.

In this example, the scatterer 100 includes a pair of supports 102A and 102B. Each of the supports 102A and 102B may be made of a rigid material and be cuboid. However, it should be understood that the supports 102A and 102B may take any one of a number of different forms and be made of different materials that may be less rigid. Furthermore, in this example, the shapes, dimensions, and materials are nearly identical for the supports 102A and 102B. Still, it should also be understood that the shapes, dimensions, and materials may vary between the supports 102A and 102B.

Figure 2A:
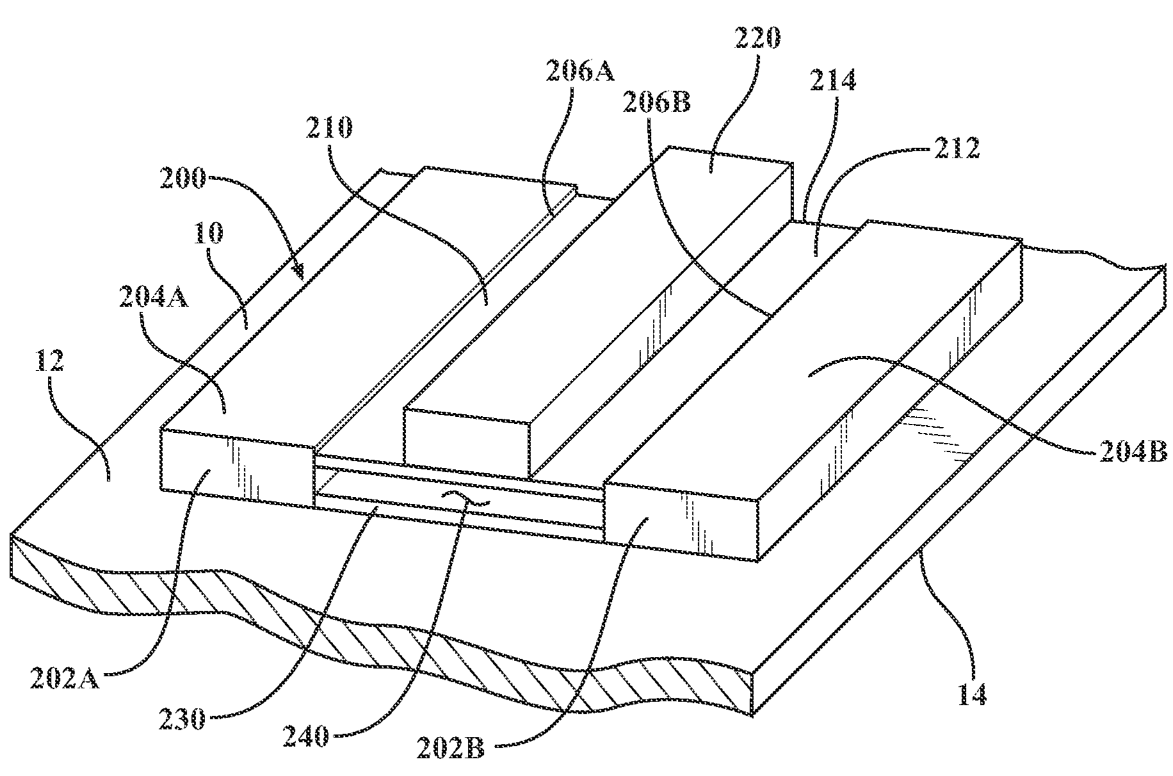
FIGS. 2A and 2B illustrate different views of another example of a scatterer capable of absorbing vibrations and/or flexural waves acting upon a structure.
Figure 2B:
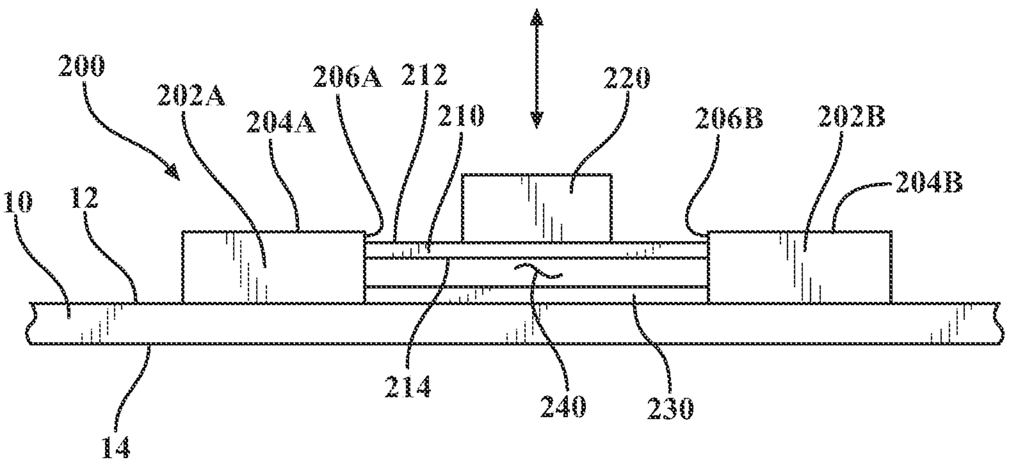

A flexible material 110 with a top side 112 and a bottom side 114 extends between the two supports 102A and 102B. In this example, the bottom side 114 of the flexible material 110 is connected to and extends between the top sides 104A and 104B of the supports 102A and 102B, respectively. However, it should be understood that the flexible material 110 can extend to and from any portion of the supports 102A and 102B, an example of which is shown in FIGS. 2A-2B and will be described later in this description. A cavity 140 is defined between the top side 12 of the beam 10, the bottom side 114 of the flexible material 110, and the sidewalls 106A and 106B of the supports 102A and 102B, respectively.

The flexible material 110 acts as a spring and damper in a mass-spring-damper system and may be made of a flexible material, such as rubber and soft plastics, such as thermoplastic elastomers and/or thermoplastic polyurethane. However, the flexible material 110 may be made of any suitable material that allows the flexible material 110 to act as a spring and damper in a mass-spring-damper system.

A mass 120 is disposed on the top side 112 of the flexible material 110, generally in an area of the flexible material 110 unsupported by the supports 102A and 102B. Due to the flexible nature of the flexible material 110, when the beam 10 experiences vibrations and/or has flexural waves acting upon it, the mass 120 resonates. As such, the mass 120 is the mass in a spring-mass-damper system. Therefore, the resonance of the scatterer 100 is based upon the mass of the mass 120 and the spring/damper characteristics of the flexible material 110. Depending on these variations, the natural resonance of the scatterer 100 can vary considerably.

The scatterer 100 may also include one or more crossbars. In this example, the scatterer 100 includes a crossbar 130 for stabilizing the position of the supports 102A and 102B with respect to each other. The crossbar 130, by stabilizing the position of the supports 102A and 102B with respect to each other, can ensure that the flexible material 110 has the appropriate tension. However, it should be understood that the scatterer 100 does not require a crossbar.

The scatterer 100 can take a number of different forms, and the example of the scatterer 100 should be understood as just one example. Referring to FIGS. 2A and 2B, illustrated is another example of a scatterer 200. In this example, like reference numerals have been utilized to refer to like elements of the scatterer 100 shown in FIGS. 1A and 1B, with the exception that they have been incremented by one hundred. As such, any description of these elements for the scatterer 100 is equally applicable to the scatterer 200 unless otherwise specified.

The scatterer 200 differs from the scatterer 100 in that the flexible material 210 extends between the sidewalls 206A and 206B of the supports 202A and 202B, respectively. As such, instead of extending between the top sides 204A and 204B, the flexible material 210 extends between the sidewalls 206A and 206B.

Figure 3:
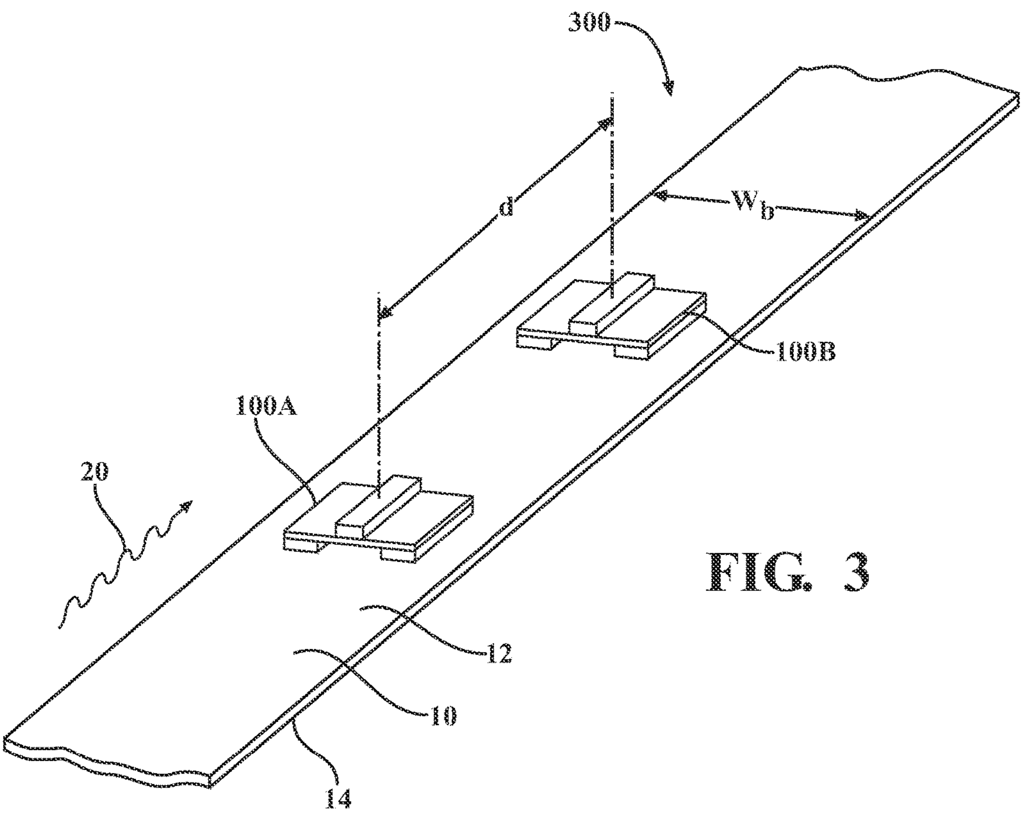
FIG. 3 illustrates one example of a system using a pair of scatterers capable of absorbing vibrations and/or flexural waves upon a structure.

The scatterers 100 and/or 200 can absorb vibrations and/or flexural waves acting upon a structure, such as the beam 10. For example, referring to FIG. 3, illustrated is one example of a system 300 that utilizes a pair of scatterers 100A and 100B, similar to the scatterer 100 described previously. Of course, it should be understood that the pair of scatterers 100A and 100B may be similar to the scatterer 200. Further still, one of the pair of scatterers may be similar to the scatterer 100, while the other may be similar to the scatterer 200.

As explained, the system 300 can substantially absorb a wave 20, such as a flexural wave, and/or vibration acting upon the structure. In this example, like before, the structure is in the form of a beam 10. The beam 10 can vary from application to application and can be made of different types of materials and have different types of dimensions, such as length, width, and thickness. Generally, the longer portion of the beam 10 is the length, while the shorter portion of the beam 10 is the width $w_b$.

Generally, the scatterers 100A and 100B are disposed on the beam 10 in a substantially similar direction of travel of the wave 20 acting upon the beam 10. In some cases, the direction in which the scatterers 100A and 100B are disposed on the beam 10 may be such that they are substantially similar to a direction defined by the length of the beam 10.

The scatterers 100A and 100B are generally separated from each other by a separation distance d. The separation distance d generally depends on the wavelength of the wave 20 acting upon the beam 10 and may be approximately one-quarter of the wavelength of the wave 20. Depending on the frequency range of waves targeted for absorption, the separation distance d can vary accordingly.

Figure 4A:
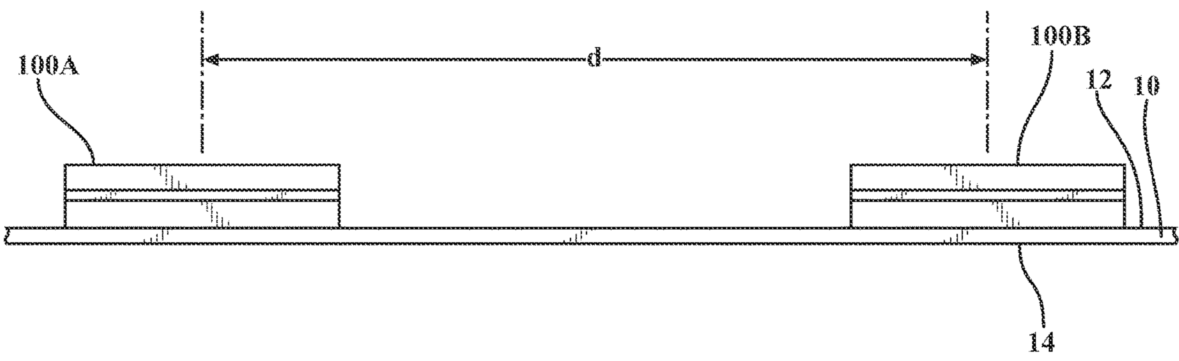
Figure 4B:
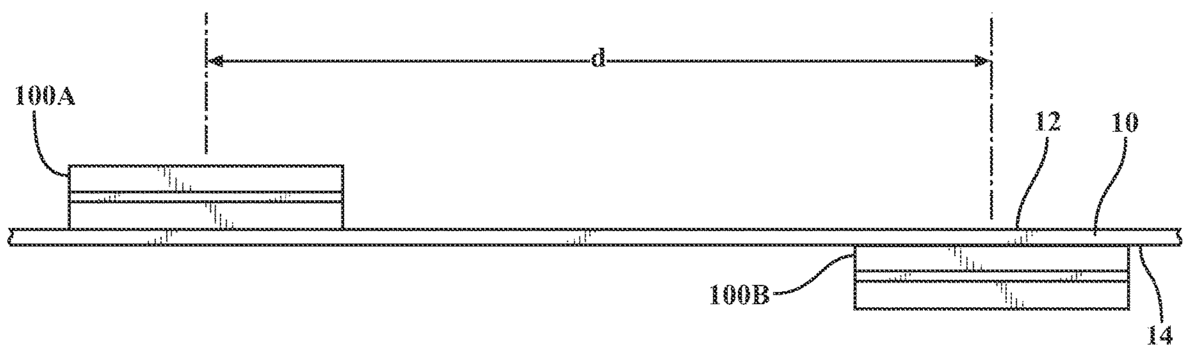

As mentioned previously and shown in FIG. 3 and better shown in FIG. 4A, the pair of scatterers 100A and 100B may be disposed on the top side 12 of the beam 10. However, it should be understood that the pair of scatterers 100A and 100B may be alternatively disposed of on the bottom side 14 of the beam 10. Further, one scatterer of the pair of scatterers 100A and 100B may be disposed of on the top side 12, while the other scatterer of the pair of scatterers 100A and 100B may be disposed of on the bottom side 14. For example, referring to FIG. 4B, illustrated is an example wherein the scatterer 100A is disposed of on the top side 12 of the beam 10, and the scatterer 100B is disposed of on the bottom side 14 of the beam 10. Notably, the separation distance d remains the same regardless of the configuration. As mentioned before, the separation distance d depends on the frequency of the wave 20 to be absorbed and is generally one-quarter of the wavelength of the wave 20.

The scatterers 100A and 100B may have a resonant frequency substantially similar to the frequency of the wave 20 acting upon the beam 10. As such, the scatterers 100A and 100B will have substantially similar resonant frequencies, which are substantially similar to the frequency of the wave 20 acting upon the beam 10. However, it should be understood that the similarity of the resonant frequencies of the scatterers 100A and 100B and that of the wave 20 may vary slightly (approximately 20% or less) to accommodate the stiffness of the flexible material 110 and other variables. For example, the resonant frequencies of the scatterers 100A and 100B may be greater than or less than the frequency of the wave 20.

Upon incidence of the wave 20 such that it acts upon the beam 10, the vibrations of the scatterers 100A and 100B will be excited. When the frequency of the wave 20 is substantially similar to the resonant frequency of the scatterers 100A and 100B, the scatterers 100A and 100B vibrate up and down with high amplitude. The scatterers 100A and 100B are treated as one unit. The monopole and dipole resonances may occur at the same frequency by tuning the size of scatterers 100A and 100B and the distance d between them.

For example, when the scatterers 100A and 100B are subject to a flexural wave, the monopole and dipole responses cancel each other in a backward direction, so there is no reflection. While the scatterers 100A and 100B have constructive interference in the forward direction resulting in a scattered forward wave, the forward scattered wave cancels the incident wave in the forward direction beyond the scatterers 100A and 100B. This way, the scatterers 100A and 100B fully absorb the flexural wave.

Figure 5A:
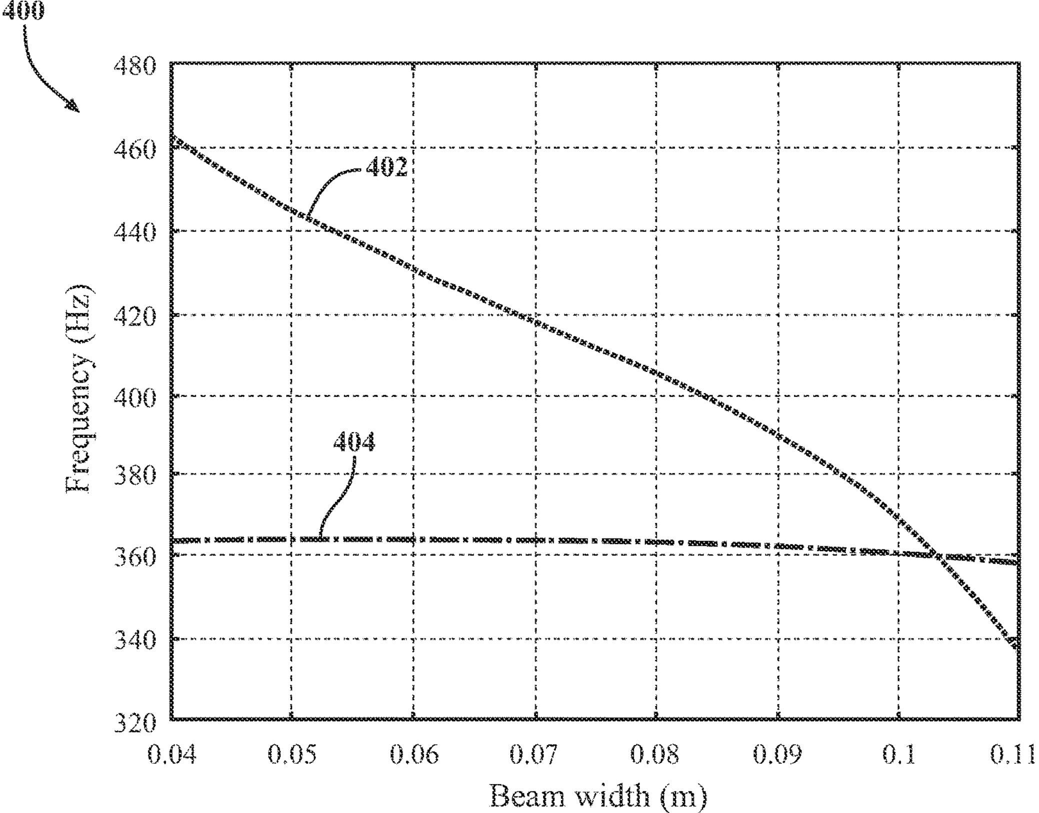
FIG. 5A illustrates the monopole and dipole resonance of the scatterers used in the example shown in FIG. 3 at different beam widths.
Figure 5B:
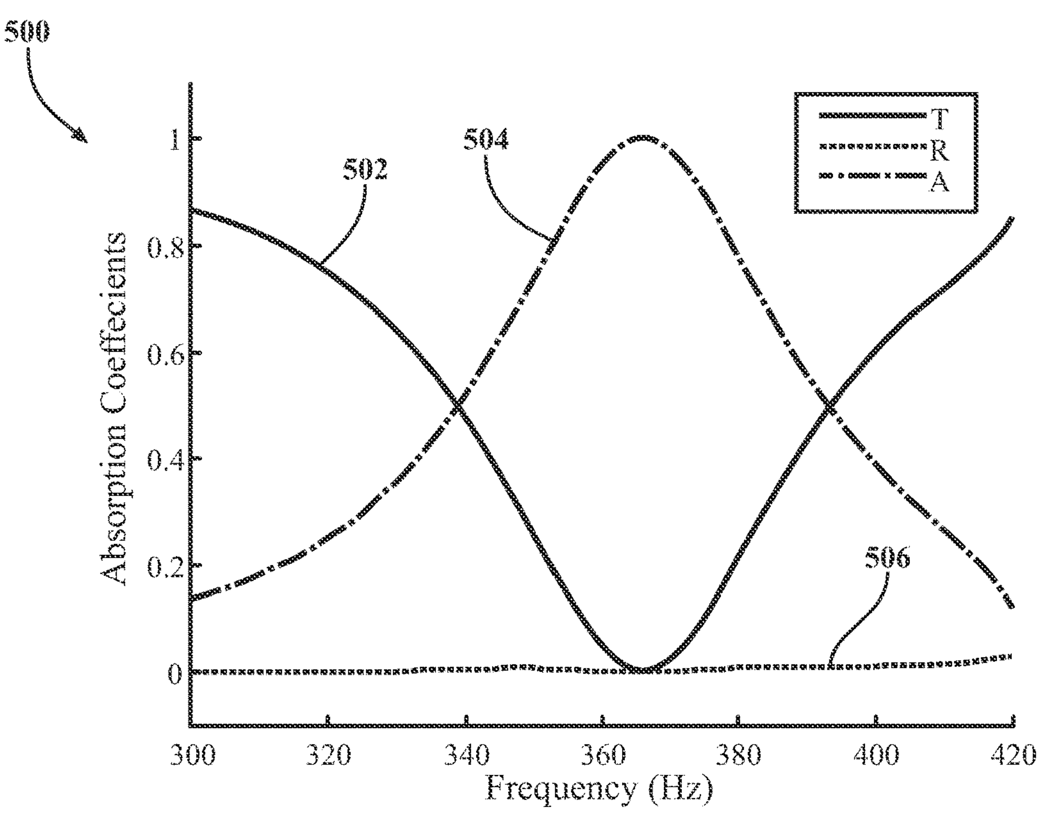
FIG. 5B illustrates the absorption coefficients of flexural waves acting upon the beam of the system of FIG. 3 at different frequencies.

Referring to FIG. 5B, illustrated is a chart 500, indicating the absorption coefficient of the system 300 of FIG. 3. In this example, the frequency of the wave 20 acting upon the beam 10 is approximately 366 Hz. As such, the resonant frequencies of the scatterers 100A and 100B may also be approximately 366 Hz. When the system 300 is configured as described, it can be seen that the transmission 502 of the wave 20 drops to almost zero at 366 Hz. The absorption 504 of the wave 20 is nearly 1.0 at 366 Hz. The reflection 506 of the wave 20 is mostly negligible.

The width $w_b$ of the beam 10 may also impact the performance of the system 300. Moreover, FIG. 5A illustrates a chart 400, indicating the monopole resonance 402 and dipole resonance 404 of the system 300. It can be seen that the dipole resonance 404 is fairly stable at 366 Hz as the width $w_b$ of the beam 10 increases. However, in this dimensional range, the monopole resonance 402 can vary significantly. As such, the resonant frequencies may need to be tuned by selecting a proper width $w_b$ of the beam 10. In this example, it was found that the two resonances degenerate when the width $w_b$ of the beam 10 equals approximately 10.3 cm.

Figure 6:
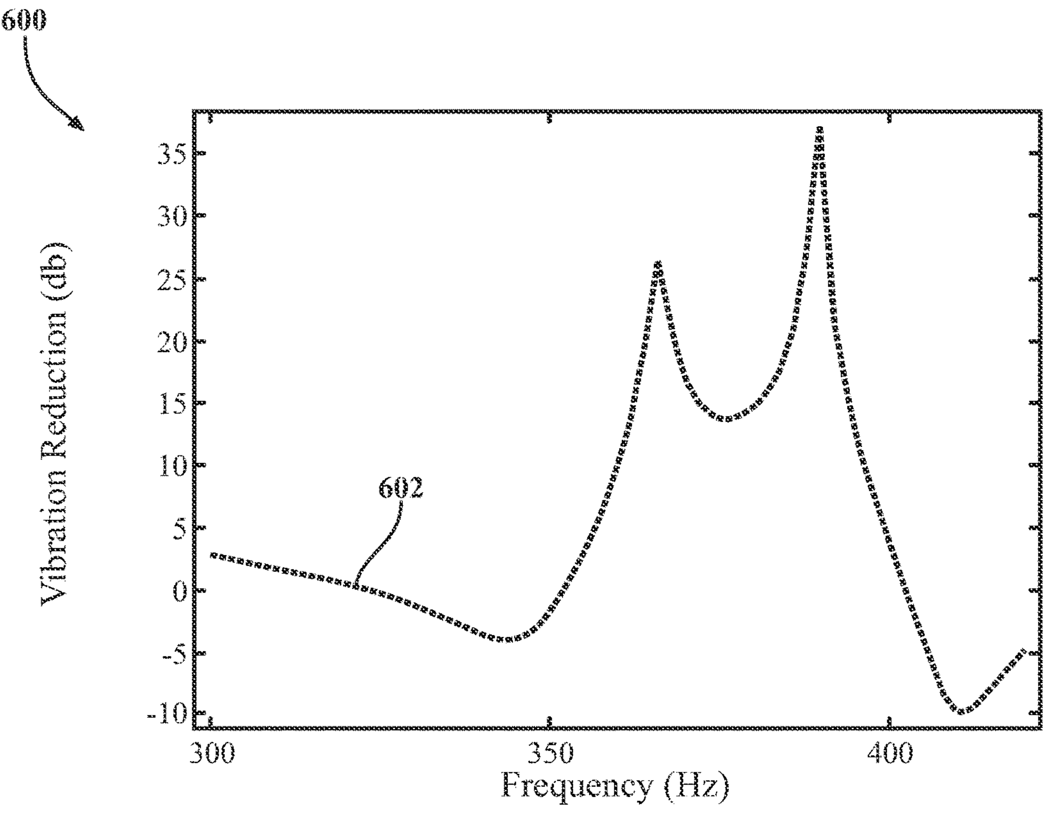
FIG. 6 illustrates the reduction of vibrations acting upon the beam of the system of FIG. 3 at different frequencies.

FIG. 6 illustrates another chart 600 indicating the vibration reduction across a range of frequencies for the system 300. Again, the resonant frequencies of the scatterers 100A and 100B are approximately 366 Hz. Vibration reduction can be seen across a generally broad frequency range between 350 Hz to 400 Hz, with peaks at approximately 360 Hz and 380 Hz.

Figure 7A:
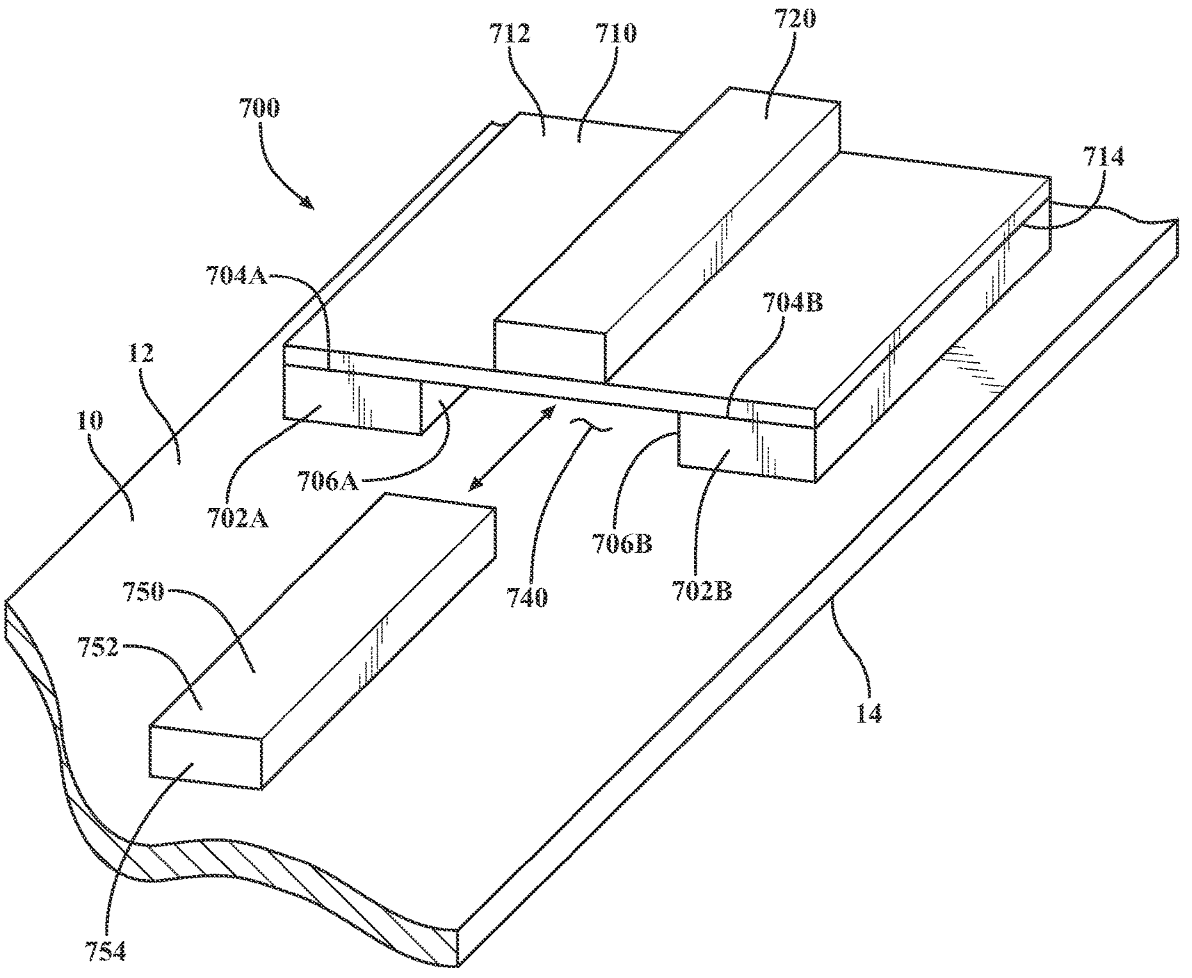
FIGS. 7A-7C illustrate different views of one example of a scatterer that can be switched on/off.
Figure 7B:
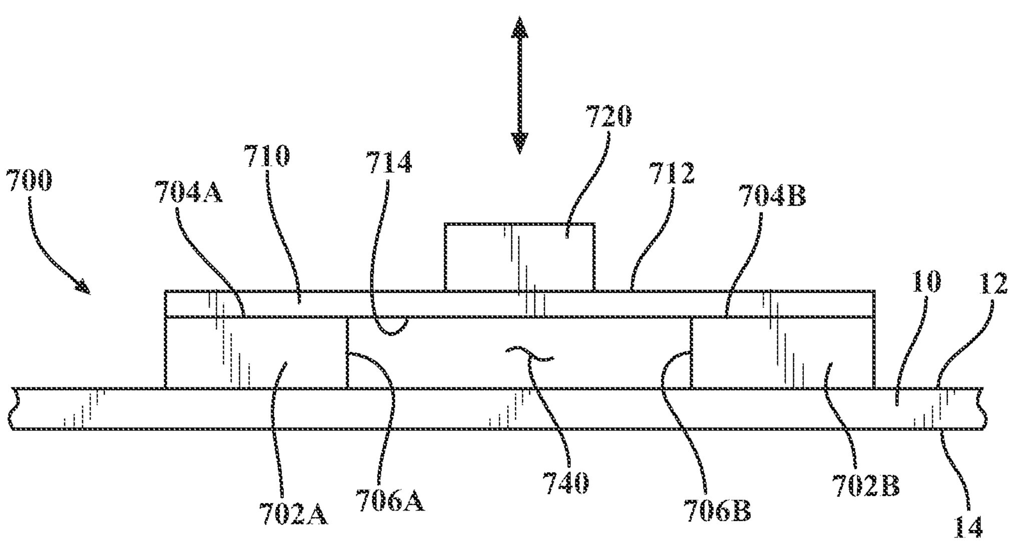
Figure 7C:
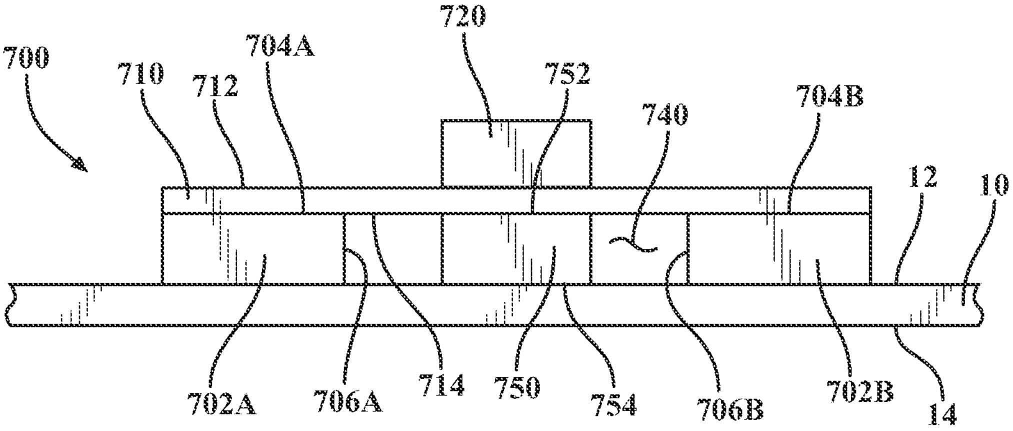

The scatterers described herein may also have the ability to be switched on/off. That is, they can be configured so they can or cannot resonate by reducing and/or eliminating the spring/damper characteristics of the flexible material 110 and 210. Moreover, referring to FIGS. 7A-7C illustrated is another example of a scatterer 700 that can be switched on/off. Like before, like reference numerals have been utilized to refer to like components, and any prior description of those components is equally applicable in this example.

The scatterer 700 (or any other scatterer described herein) can be switched on/off by placing a member 750 within the cavity 740. FIG. 7B illustrates a situation wherein the member 750 is not inserted into the cavity 740. As such, the mass 720 is free to travel in an up-and-down direction, essentially allowing the scatterer 700 to resonate. Conversely, FIG. 7C shows that the member 750 is inserted within the cavity 740, preventing the movement of the mass 720 in an up-and-down direction.

Generally, the member 750 is made of rigid material that has been dimensioned to fit within the cavity 740. Generally, the member 750, when inserted into the cavity 740, is dimensioned such that it comes into contact with both the top side 12 of the beam 10 and the bottom side 714 of the flexible material 710. In this example, the member 750 has a substantially flat top side 752 that comes into contact with the bottom side 714 of the flexible material 710. The member 750 also includes a substantially flat bottom side 754 that comes into contact with the top side 12 of the beam 10.

While the member 750 is only shown to be coming into contact with the flexible material 710 and the beam 10, the member 750 can also be dimensioned to come into contact with the supports 702A and 702B. The member 750 may also include one or more rough surfaces that allow the member 750 to better frictionally engage the flexible material 710 and/or the beam 10 to prevent the unintentional movement of the member 750.

Figure 8:
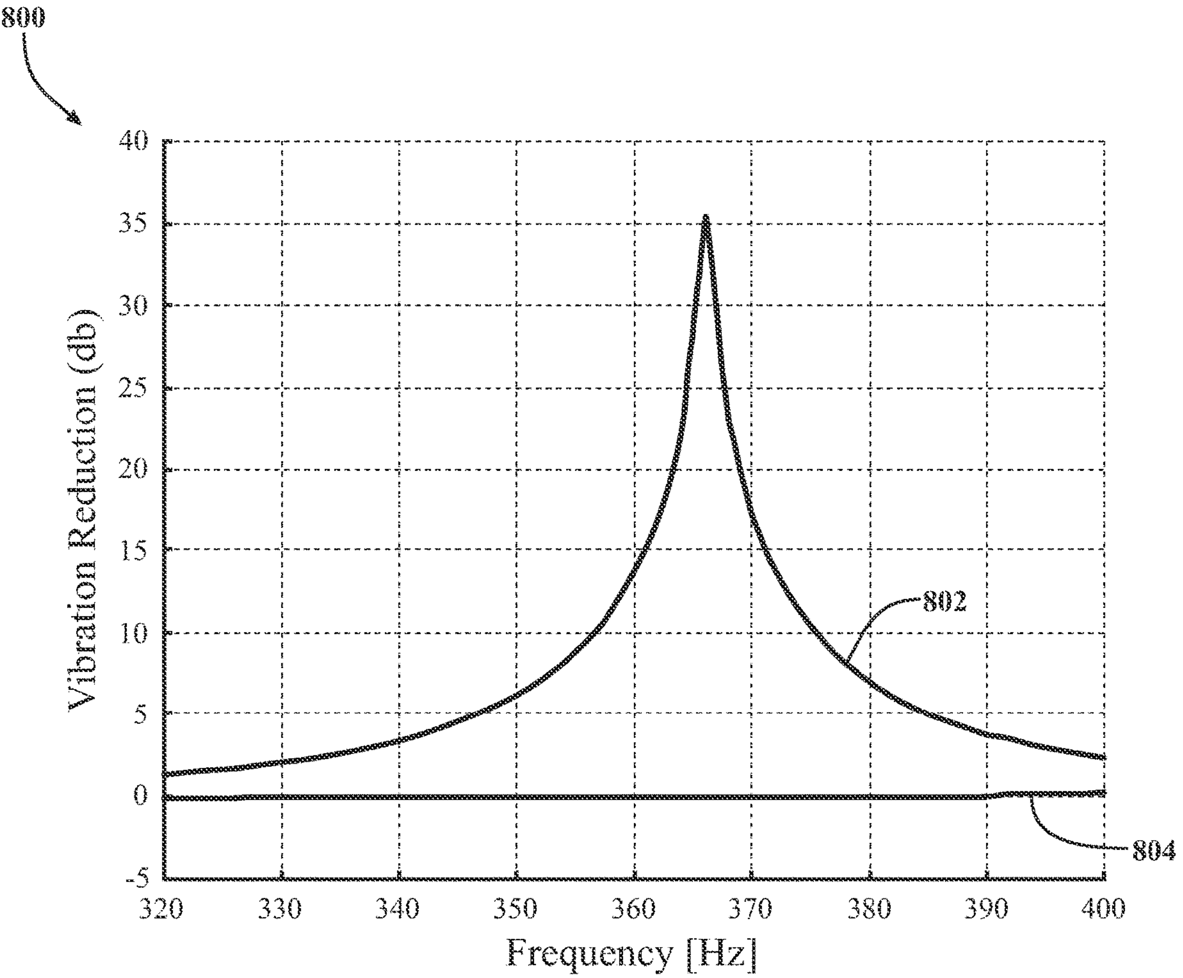
FIG. 8 compares the vibration reduction when the scatterers of FIGS. 7A-7C are switched on/off.

FIG. 8 illustrates a chart 800, which shows what occurs when appropriate members are inserted into scatterers. In this example, the frequency of the target vibration to be reduced is approximately 366 Hz, meaning that the scatterers, in this example, may also have a resonance frequency of approximately 366 Hz. When no member is inserted into the cavity of the scatterers, the scatterers are essentially switched on and provide good vibration reduction at approximately 366 Hz, as shown by line 802. Conversely, when a member is inserted into the cavity of the scatterers, the scatterers are essentially switched off and provide little vibration reduction, as shown by line 804. As such, the systems and scatterers described in this disclosure can be switched on/off, allowing for the targeted and selectable reduction of flexural waves and/or vibrations acting upon a structure.

The preceding description is illustrative and does not intend to limit the disclosure, application, or use. The phrase at least one of A, B, and C should be construed to mean a logical (A or B or C), using a non-exclusive logical "or." Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments with stated features is not intended to exclude other embodiments with additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referred to the same aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A scatterer comprising:

a pair of supports separated from each other by a distance;

a flexible material extending between the supports;

a mass disposed on the flexible material; and a member configured to be selectively placed within a cavity defined between the pair of supports and the flexible material that prevents flexing of the flexible material when located within the cavity.

2. The scatterer of claim 1, further comprising a rigid crossbar extending between the supports.

3. The scatterer of claim 1, wherein the scatterer further comprises a pair of scatterers configured to be disposed on a structure and separated from each other by a separation distance.

4. The scatterer of claim 3, wherein:

the pair of scatterers are configured to be arranged on the structure in a direction substantially similar to the direction of a flexural wave acting on the structure; and wherein the separation distance is approximately one-quarter of a wavelength of the flexural wave acting on the structure.

5. The scatterer of claim 4, wherein a resonant frequency of the pair of scatterers is approximately equal to a frequency of a wave acting on the structure.

6. The scatterer of claim 5, wherein the flexible material is rubber.

7. The scatterer of claim 1, wherein the flexible material has a first side and a second side that partially defines the cavity, the mass being connected to the first side of the flexible material.

8. The scatterer of claim 7, wherein the member is directly adjacent to the second side of the flexible material when located within the cavity.

9. The scatterer of claim 8, wherein a base surface supports the pair of supports and the member when the member is located within the cavity.

10. The scatterer of claim 1, wherein the member is made of a rigid material.

11. A system for absorbing a flexural wave acting on a structure, the system comprising:

a pair of scatterers disposed on the structure and separated from each other by a separation distance;

each of the scatterers comprise:

a pair of supports;

a flexible material extending between the pair of supports, a cavity being defined between the pair of supports and the flexible material;

a mass connected to the flexible material; and a member configured to be selectively placed within the cavity that prevents flexing of the flexible material when located within the cavity.

12. The system of claim 11, wherein the separation distance is approximately one-quarter of a wavelength of the flexural wave acting on the structure.

13. The system of claim 11, wherein a resonant frequency of the scatterers forming the pair is approximately substantially equal to or greater than a frequency of the flexural wave acting on the structure.

* * * * *